United States Patent [19]

Tsuchiyama et al.

[11] Patent Number: 5,821,738
[45] Date of Patent: Oct. 13, 1998

[54] POWER SUPPLY WITH SINGLE DC/DC CONVERTER SELECTIVELY OUTPUTTING EITHER OF TWO VOLTAGE LEVELS

[75] Inventors: Kinya Tsuchiyama, Tokyo; Takayasu Ishida, Shizuoka; Nobuyuki Katada, Shizuoka, all of Japan

[73] Assignee: NEC Corporation, Tokyo, Japan

[21] Appl. No.: 721,847

[22] Filed: Sep. 30, 1996

Related U.S. Application Data

[63] Continuation of Ser. No. 343,928, Nov. 17, 1994.

[30] Foreign Application Priority Data

Nov. 19, 1993 [JP] Japan .................................. 5-289662

[51] Int. Cl.⁶ ...................................................... G05F 1/10
[52] U.S. Cl. ............................................ 323/222; 323/225
[58] Field of Search ................................... 323/222, 223, 323/370, 225; 363/156, 19, 21, 32, 157, 163, 164; 315/194

[56] References Cited

U.S. PATENT DOCUMENTS

| 4,376,263 | 3/1983 | Pittroff et al. ............................. 320/32 |
| 4,605,999 | 8/1986 | Bowman et al. ......................... 363/19 |
| 4,766,528 | 8/1988 | Marinus .................................... 363/21 |
| 4,797,599 | 1/1989 | Ference et al. .......................... 315/194 |
| 5,307,003 | 4/1994 | Fairbanks et al. ....................... 323/222 |

FOREIGN PATENT DOCUMENTS

| 0056731 | 7/1982 | Japan . |
| 4-211528 | 8/1992 | Japan . |
| 2258370 | 2/1993 | United Kingdom . |

*Primary Examiner*—Shawn Riley
*Attorney, Agent, or Firm*—Sughrue, Mion, Zinn, Macpeak & Seas, PLLC

[57] ABSTRACT

A receiver of a selective calling receiver contains a single DC/DC converter selectively outputting either voltage V1 or voltage V2, V2 being greater than V1. The DC/DC converter outputs the first operation-supporting voltage V1 in standby mode and the second operation-supporting voltage V2 when the received signal is stored or read into or from a RAM.

23 Claims, 5 Drawing Sheets

POWER SUPPLY WITH SINGLE DC/DC CONVERTER SELECTIVELY OUTPUTTING EITHER OF TWO VOLTAGE LEVELS

This is a Continuation of application Ser. No. 08/343,928, filed on Nov. 17, 1994.

BACKGROUND OF THE INVENTION

1. Field of the Invention

The present invention relates to a power supply control, and more particularly, to a power supply control for a selective calling receiver having a DC/DC converter for converting a battery voltage to a predetermined voltage required for operation of the receiver components.

2. Description of the Related Art

To reduce consumed power of a selective calling receiver and conserve battery life, a selective calling receiver having two DC/DC converters is described in, for example, Japanese Patent Laid-Open Application No. 211528/92 (JP 04-211528.) However, since the receiver has two DC/DC converters miniaturization is difficult and the cost is high.

SUMMARY OF THE INVENTION

It is therefore an object of the present invention to provide a selective calling receiver capable of enabling reduction in cost and increase in miniaturization.

Another object of the present invention is to provide a selective calling receiver capable with a single DC/DC converter outputting a lower operating voltage while waiting for signals transmitted from a base station and a higher voltage during times the receiver is receiving a message or transmitting a message.

A power supply control for a receiver according to the present invention includes a battery as a power source, and a single DC/DC converter for converting the battery voltage into first or second operation-supporting voltages for receiver components, the second operation-supporting voltage being higher than the first. These receiver components include first circuitry operated at the first operation-supporting voltage, and second circuitry operated at the second operation-supporting voltage. The DC/DC converter includes a switch under control of a controller for switching the output voltage between the first operation-supporting voltage and the second operation-supporting voltage during the period the second circuitry is operative. The second circuitry includes a RAM storing a received message.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

Figure 1:
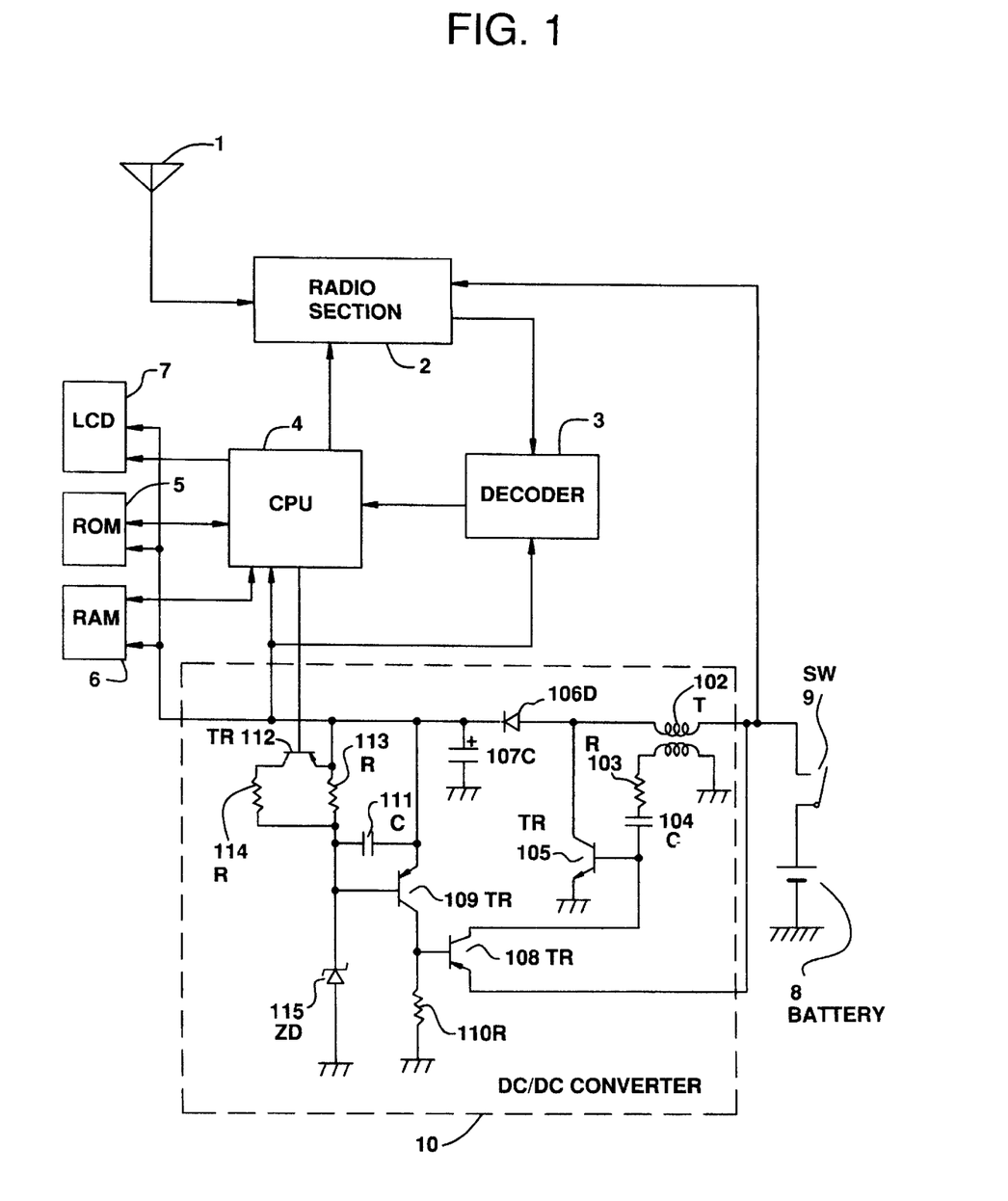
FIG. 1 is a block diagram of a preferred embodiment of the present invention.

FIG. 1 is a block diagram of a preferred embodiment of the present invention. In FIG. 1, a selective calling receiver consists of an antenna 1, a radio section 2, a decoder 3, a CPU 4, a ROM 5, a RAM 6, an LCD 7, a battery 8, a power-supply switch 9 and a DC/DC converter 10.

The radio section 2 receives a radio frequency signal from a base station (not shown) through the antenna 1 and executes waveform shaping of that signal. An output voltage of the battery 8 is supplied directly through the switch 9 to the radio section 2. The decoder 3 decodes the signal from the radio section 2. The CPU 4 controls each circuit in response to a decoded signal from the decoder 3. The ROM 5 stores a predetermined identification number or calling number and supplies the number to the CPU 4 to compare the number with a received number. The RAM 6 stores a received message and the LCD 7 displays the received message.

The DC/DC converter 10 converts the output voltage of the battery 8 to a predetermined first or second operation-supporting voltage V1 or V2, which is higher than V1, and supplies the first or second operation-supporting voltage to the receiver components. In a standby mode for receiving a calling signal, the decoder 3, CPU 4, ROM 5, RAM 6 and LCD 7 operate at the first operation-supporting voltage V1. In writing or reading a message into or from the RAM 6, since the RAM 6 needs the second operation-supporting voltage V2, the voltage V2 is supplied to all components but for the radio section 2.

The construction of the DC/DC converter 10 will now be described.

The DC/DC converter 10 includes a step-up transformer 102 having one end of its primary winding connected to the battery 8 through the switch 9 and one end of its secondary winding connected to the ground. A first resistor 103 and a first capacitor 104 for providing oscillation are connected in series to the other end of the secondary winding of the transformer 102. An emitter, base and collector of a first transistor 105, for switching, are connected to the ground, the other end of the first capacitor 104 and the other end of the primary winding of the transformer 102, respectively. An anode of a diode 106 is connected to the junction of the collector of the transistor 105 and the other end of the primary winding of the transformer 102. A second capacitor 107, for smoothing, is connected between the ground and a cathode of the diode 106.

A base, emitter and collector of a second transistor 108, for controlling, are respectively connected to a second resistor 110, for bias, whose other end is connected to the ground, the one end of the primary winding of the transformer 102, and a junction of the other end of the first capacitor 104 and the base of the first transistor 105. A collector of a third transistor 109, for controlling is connected to a junction of the base of the second transistor 108 and the one end of the second resistor 110, and its emitter is connected to the cathode of the diode 106. A third capacitor 111, for noise reduction is connected between a base and emitter of the third transistor 109.

A cathode and anode of a first Zener diode 115, for determining an output voltage of the DC/DC converter 10, are respectively connected to the base of third transistor 109 and ground. A base of a fourth transistor 112, for switching converted-voltages, is connected to a control signal output terminal of the CPU 3 and its emitter is connected to the cathode of the diode 106. A third resistor 113, whose one and the other end are respectively connected to the emitter of the fourth transistor 112 and the cathode of the first Zener diode 115, operates to determine a first Zener current for generating the first operation-supporting voltage V1. A fourth resistor 114, whose one and the other end are respectively connected to the collector of the fourth transistor 112 and the cathode of the first Zener diode 115, operates to determine a second Zener current for generating the second operation-supporting voltage V2. The first or second operation-supporting voltage V1 or V2 is supplied from the cathode of the diode 106 to the receiver components such as the CPU 3, decoder 4, ROM 5, RAM 6 or LCD 7.

Next, the operation of the DC/DC converter 10 will be described in detail.

Once the switch 9 is closed, the DC/DC converter 10 is powered by the battery 8. Since the base potential of the second transistor 108 is low, the transistor 108 is turned on, so that the first transistor 105 starts to oscillate at a frequency determined by the first resistor 103 the capacitor 104, and the primary winding of the transformer 102. This oscillation applies positive feedback to the base and collector of the first transistor 105 through the transformer 102.

Pulses, determined by the peak value of this oscillation frequency and the output voltage of the battery 8, undergo waveform shaping through the diode 106 and are smoothed by the second capacitor 107. Consequently a direct current (dc) voltage appears across the second capacitor 107 as the output voltage of the DC/DC converter 10.

As the dc voltage rises, the value of the current flowing through the third resistor 113 increases based on the voltage-current characteristics of the third resistor 113 and the first Zener diode 115. This current-increase causes a rise in voltage between both ends of the third resistor 113 and an increase in voltage between the base-to-emitter voltage of the third transistor 109, thus the third transistor is turned on.

Upon turn-on of the third transistor 109, the base potential of the second transistor 108 goes high and thus the second transistor 108 turns off. Therefore, the base potential of the first transistor 105 goes low and, consequently, the oscillation at the first transistor 105, transformer 102 and first resistor 103 stops. Since the oscillation is stopped, the feedback disappears and the dc voltage across the second capacitor 107 drops.

When the dc voltage across the second capacitor 107 drops sufficiently, the third transistor 109 turns off and the second transistor 108 turns on because of the low base potential. Thus the initial state is returned. This procedure is repeated until it reaches the Zener voltage of the first Zener diode 115, i. e., the first operation-supporting voltage V1. At this time the output voltage of the DC/DC converter 10 is stabilized at V1.

When the fourth transistor 112 is turned on in response to a control signal from the CPU 4, the base-to-emitter voltage of the third transistor 109 drops. Therefore, the third transistor 109 remains off with its emitter at the voltage V1 and remains off until voltage VI is reached. That is, the output voltage of the DC/DC converter 10 rises until a base voltage is reached allowing the third transistor 109 to turn on.

When the output voltage rises to such level that the base-to-emitter voltage allows the third transistor 109 to turn on, the second transistor 108 is turned off, consequently, the oscillation by means of the first transistor 105, transformer 102 and first resistor 103 and capacitor 104 stops, and the output voltage stops rising. The stop of the oscillation results, in turn, in stopping of positive feedback of the transformer 102, and in drop of the dc voltage across the second capacitor 107 and the base-to-emitter voltage of the third transistor 109. Then the third transistor 109 turns off, and the second transistor 108 turns on. The oscillation of the first transistor 105, transformer 102 and first resistor 103 and capacitor 104 starts again, and the voltage across the second capacitor 107 rises.

The above-mentioned sequence of the operation is repeated, and thereby the output voltage of the DC/DC converter 10 goes to the second operation-supporting voltage V2 which is higher than the first output voltage V1.

Figure 2:
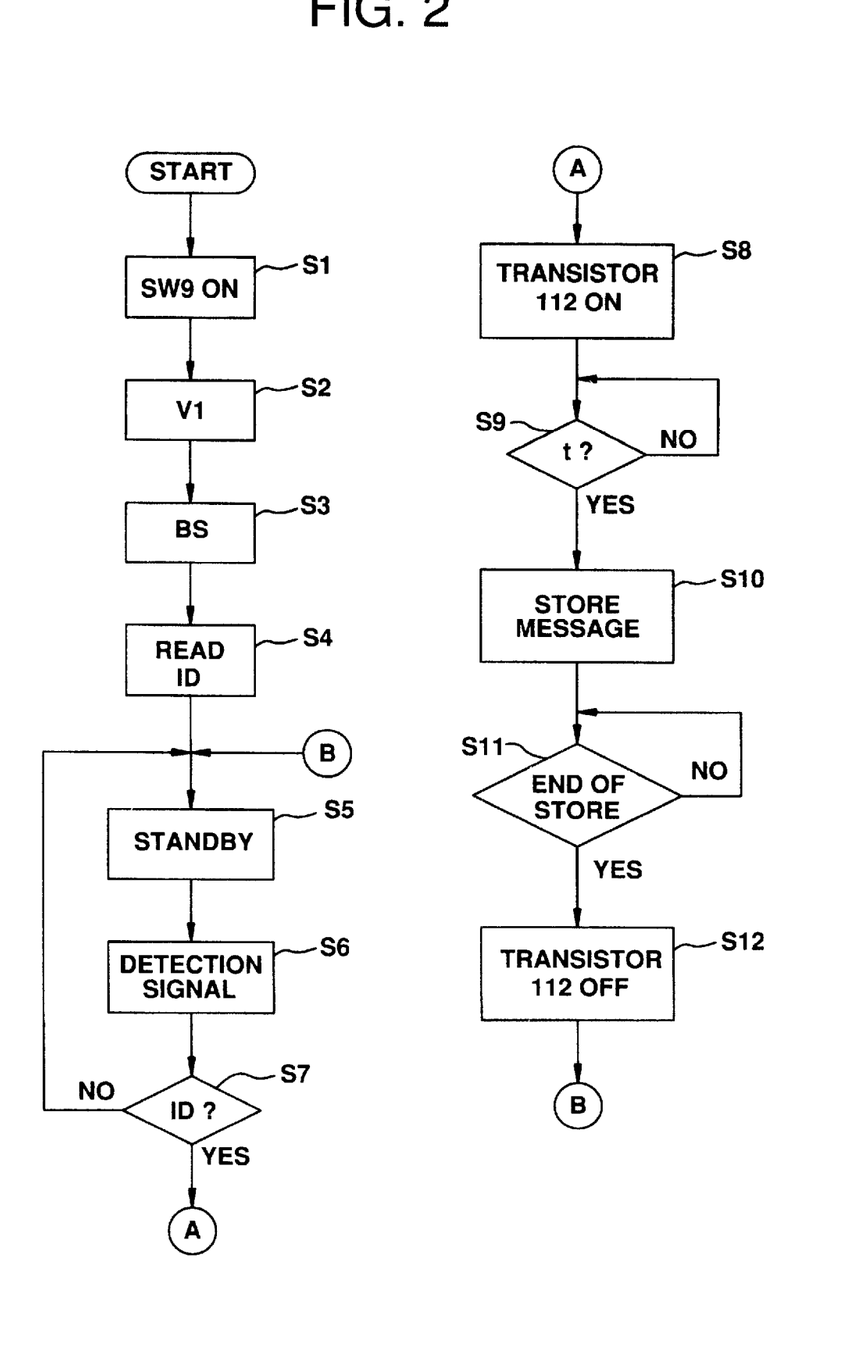
FIG. 2 is a flowchart illustrating a control procedure of the DC/DC converter shown in FIG. 1.

The power supply operation according to the present invention will be described with reference to FIGS. 2 to 4. FIG. 2 is flowchart illustrating a preferable control procedure for the DC/DC converter 10 according to the present invention, FIGS. 3(a) to 3(e) illustrate a preferable operation timing chart according to the present invention, and FIG. 4 are the resulting preferable waveforms of the output voltage of the DC/DC converter according to the present invention.

Figure 3A:
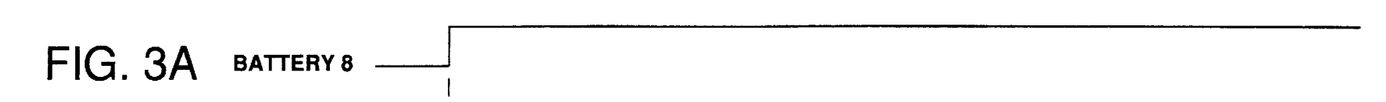
FIGS. 3(a)–3(e) illustrate timing charts to explain an operation timing according to the present invention.
Figure 4:
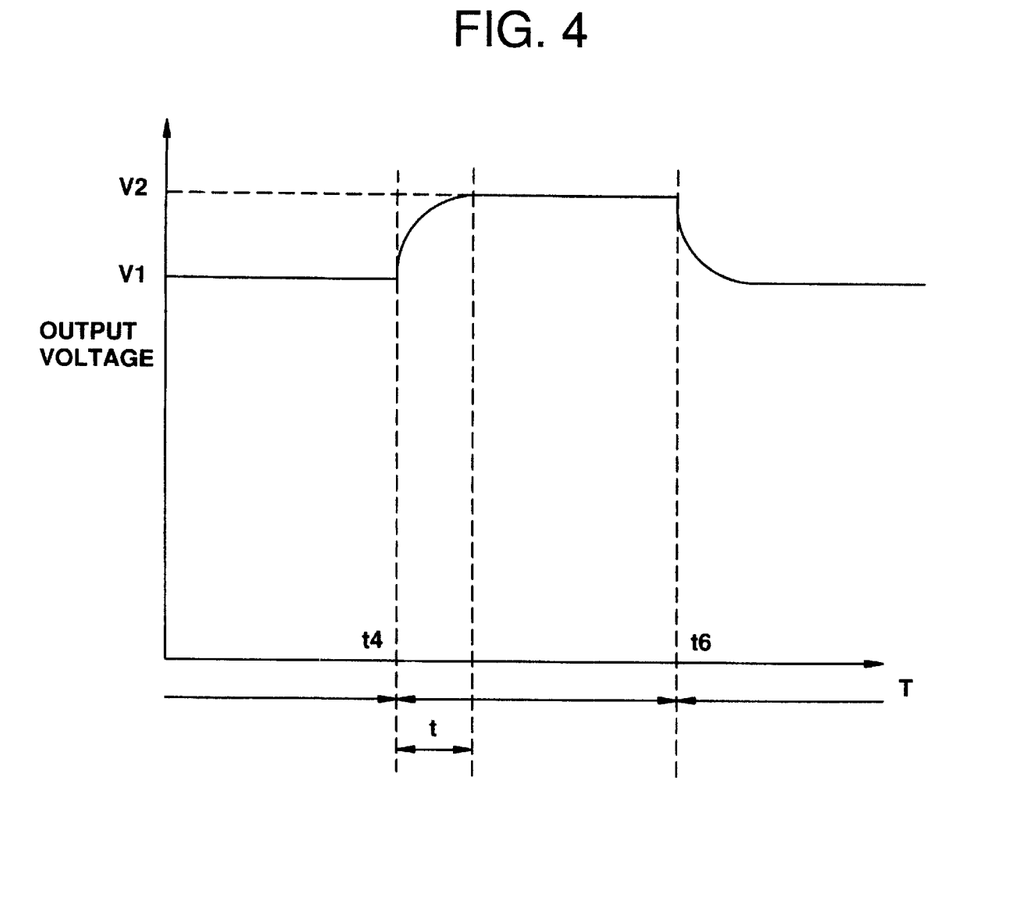
FIG. 4 is a preferred waveform of an output-voltage from the DC/DC converter shown in FIG. 1.

When the switch 9 is closed (Step 1 in FIG. 2), the output voltage of the battery 8 is supplied to the radio section 2 and the DC/DC converter 10 through the switch 9 as shown in FIG. 3(a). The DC/DC converter 10 supplies the first operation-supporting voltage V1 (Step 2) to the receiver components as above-mentioned operation.

Figures 3B, 3C:
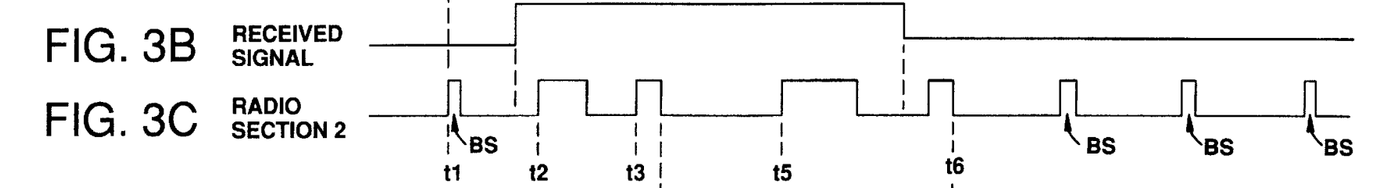
Figures 3D, 3E:
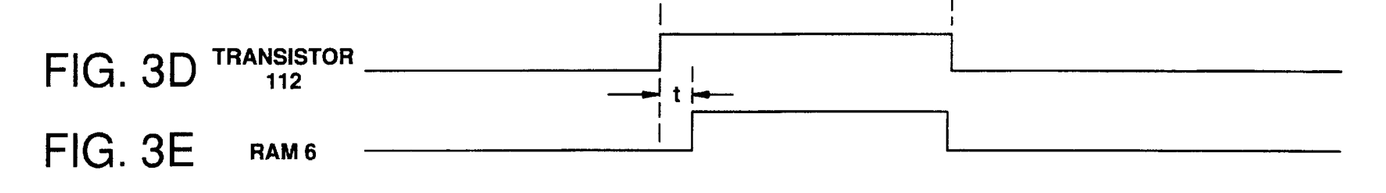

The radio section 2 starts intermittent operation at a timing t1 in FIG. 3(c) under control of the CPU 4 with battery saving (BS) effect (Step 3). The CPU 4 additionally reads out the predetermined calling number or identification (ID) number from the ROM 5 (Step 4) to a RAM in the CPU 4. Thus, the receiver enters a standby mode (Step 5) to receive a signal from a base station as shown in FIG. 3(b).

Once the radio section 2 detects the signal from the base station (Step 6) at a timing t2 shown in FIG. 3(c), the CPU 4 performs synchronization and checking whether an ID number in a received signal coincides with the predetermined ID number or not (Step 7) at a timing t3 as shown in FIG. 3(c). If both ID numbers do not coincide, the radio section 2 starts the intermittent operation under control of the CPU 4 again. If both ID numbers coincide, the CPU 4 turns on the fourth transistor 112 in the DC/DC converter 10 (Step 8) as shown in FIG. 3(d) so as to output the second operation-supporting voltage V2 to store a received message into the RAM 6, the message being received at timing t5 shown in FIG. 3(c).

A time "t" is set from turning on the fourth transistor 112 (Step 9). The time "t" is nearly equal to time required until the DC/DC converter 10 outputs the second operation-supporting voltage V2. The time "t" may be longer than that required time. Therefore, "t" seconds after the fourth transistor 112 is turned on, the message is received and the received message is stored in the RAM 6 (Step 10) as shown in FIG. 3(e).

When the CPU 4 detects no signals received from the base station and the storing of the message is finished (Step 11), the CPU 4 executes a turn off of the fourth transistor 112 (Step 12) at time t6 shown in FIG. 3(c). As a result, the output voltage of the DC/DC converter 10 returns to the first operation-supporting voltage V1. Furthermore, the radio section 2 continues the BS operation as shown in FIG. 3(c) and the CPU 4 assumes the standby mode.

As shown in FIG. 4, the DC/DC converter 10 outputs the first voltage V1 until time t4. The second voltage V2 is produced until time t6 following the interval "t" which begins at time t4. Thereafter, the first voltage V1 is again produced.

Figure 5:
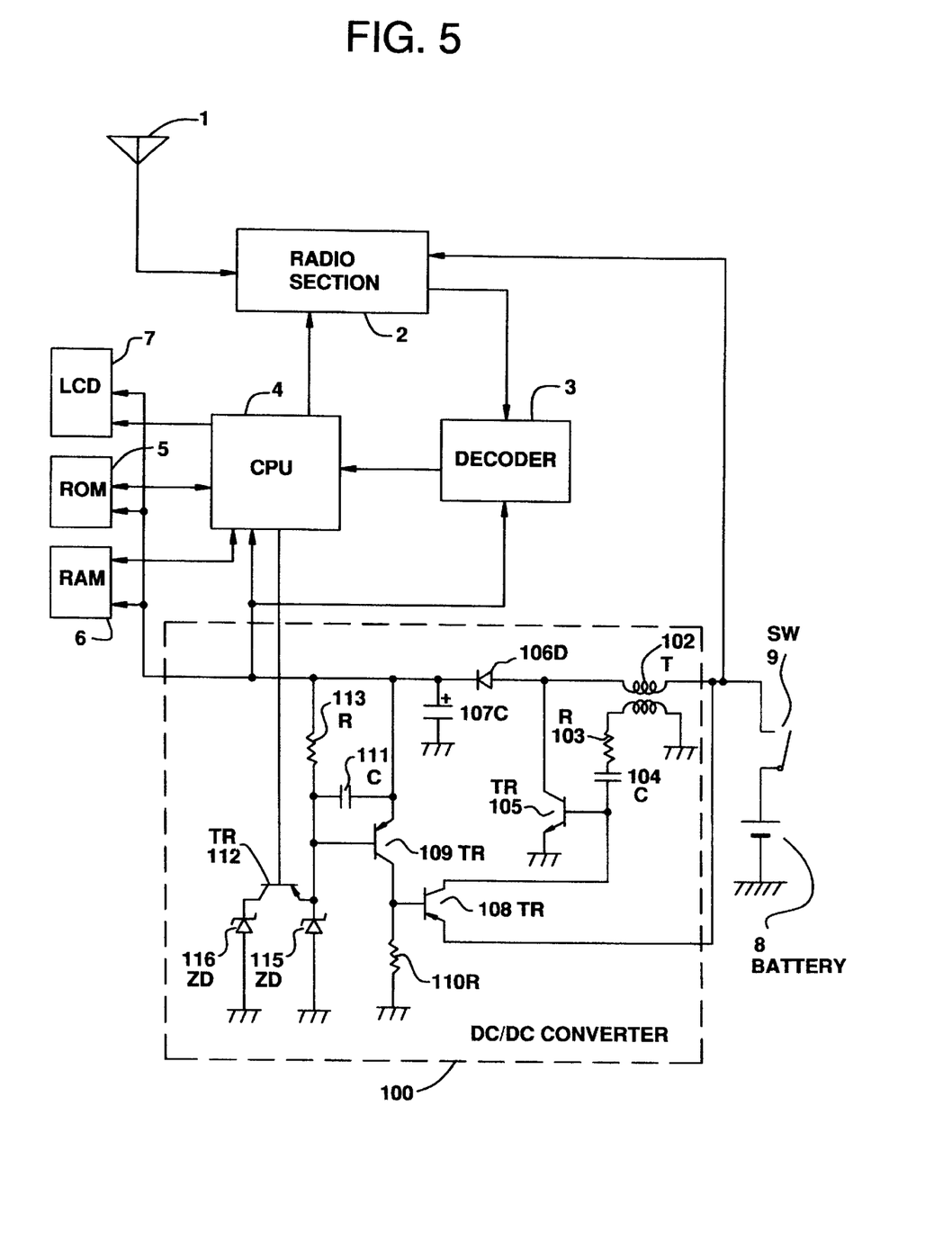
FIG. 5 is a block diagram of another preferred embodiment according to the present invention.

FIG. 5 is a block diagram of another preferred embodiment according to the present invention.

In FIG. 5, a DC/DC converter 100 is used instead of the DC/DC converter 10 in FIG. 1. The DC/DC converter 100 has a second Zener diode 116 instead of the fourth resistor 114 in the DC/DC converter 10. The collector of the fourth transistor 112 is connected to a cathode of the second Zener diode 116 whose anode is connected to the ground. A Zener voltage of the second Zener diode 116 is higher than the Zener voltage of the first Zener diode 115 and functions to generate the second operation-supporting voltage V2. When the fourth transistor 112 turns off, the first Zener diode 115 is connected to the other circuits and the DC/DC converter 100 and supplies the first output voltage V1 thereto. On the other hand, when the fourth transistor 112 turns on, the first and second Zener diodes 115 and 116 are connected in parallel and the DC/DC converter 100 supplies the second output voltage V2. As the remainder of this second embodiment corresponds to the FIG. 1 embodiment, a further description thereof is omitted.

As described hereinbefore, according to the present invention, even though the receiver includes two kinds of circuitry which work at different operating voltages, since the DC/DC converter selectively outputs two different operation-supporting voltages V1 and V2 under the control of the CPU, it is possible to output a higher operating voltage V2 only when necessary and to output a lower operating voltage V1 at other times. Therefore, it is possible to reduce steady-state consumption current in the standby mode.

Furthermore, since it is unnecessary to provide two DC/DC converters, it is possible to reduce cost and increase miniaturization.

Although the embodiment has been described with respect to a case in which the modification was based on a specific arrangement, it goes without saying that the present invention is not restricted to this case.

What is claimed is:

1. A power supply control of a receiver, comprising:
   a battery producing a battery voltage;
   DC/DC converting means for converting said battery voltage into one of a first operating voltage and a second operating voltage, and for supplying said one of said first operating voltage and said second operating voltage to circuitry within said receiver, said circuitry including a first and a second memory, said first memory storing a receiver identification for said receiver, said second memory being operable to store data when provided with said second operating voltage but not when provided with said first operating voltage; and
   control means for selectively controlling said DC/DC converting means to generate said one of said first operating voltage and said second operating voltage, wherein said control means responds to a received transmission by controlling said DC/DC converter to generate said second operating voltage when a received transmission indicates said stored receiver identification, and to generate said first operating voltage when said received transmission does not indicate said stored receiver identification;
   wherein said second memory, while supplied with said secondary operating voltage, stores at least a portion of said received transmission.

2. The power supply control as claimed in claim 1, wherein said first operating voltage is higher than said voltage from said battery and lower than said second operating voltage.

3. The power supply control as set forth in claim 1, wherein said DC/DC converting means comprises only one DC/DC converter.

4. The power supply control as claimed in claim 1, wherein:
   said control means determines whether said second operating voltage is to be supplied to said circuitry based on information content of a signal received by said receiver; and
   said control means supplies said DC/DC converting means with a control signal at said predetermined timing so as to supply said second operating voltage to said circuitry.

5. The power supply control as claimed in claim 4, wherein said control means outputs said control signal when a predetermined identification number is detected from said signal received by said receiver.

6. A power supply control for a receiver comprising:
   a battery;
   a DC/DC converter, having a switch, for converting a voltage from said battery into a first operation-supporting voltage in a first state, for converting said voltage from said battery into a second operation-supporting voltage in a second state, 9 for supplying one of said first operation-supporting voltage and said second operation-supporting voltage to circuitry within said receiver; and
   a controller for controlling said switch based on said first and second state and for switching said first state to said second state at a predetermined timing;
   wherein said first operation-supporting voltage is higher than said voltage from said battery and lower than said second operation-supporting voltage.

7. The power supply control as set forth in claim 6, wherein said receiver has only one said DC/DC converter.

8. A power supply control for a receiver comprising:
   a battery;
   a DC/DC converter, having a switch, for converting a voltage from said battery into a first operation-supporting voltage in a first state, for converting said voltage from said battery into a second operation-supporting voltage in a second state, 9 for supplying one of said first operation-supporting voltage and said second operation-supporting voltage to circuitry within said receiver; and
   a controller for controlling said switch based on said first and second state and for switching said first state to said second state at a predetermined timing;
   wherein said switch comprises a transistor, said controller turning on said switch in said second state and turning off said switch in said first state.

9. The power supply control as set forth in claim 8, wherein said receiver has only one said DC/DC converter.

10. A power supply control for a receiver comprising:
    a battery;
    a DC/DC converter, having a switch, for converting a voltage from said battery into a first operation-supporting voltage in a first state, for converting said voltage from said battery into a second operation-supporting voltage in a second state, 9 for supplying one of said first operation-supporting voltage and said second operation-supporting voltage to circuitry within said receiver; and
    a controller for controlling said switch based on said first and second state and for switching said first state to said second state at a predetermined timing;
    wherein said DC/DC converter comprises:
       a transformer, one end of a primary winding thereof being connected to said battery and one end of a secondary winding thereof being connected to ground potential;

a first resistor;

a first capacitor, connected at one end to the other end of the secondary winding of said transformer through said first resistor;

a first transistor, whose emitter, base and collector are connected to ground, the other end of said first capacitor and the other end of the primary winding of said transformer, respectively;

a diode, whose anode is connected to a junction of the collector of said first switching transistor and the other end of the primary winding of said transformer;

a second capacitor, connected between ground and a cathode of said diode;

a second resistor one end of which is connected to ground;

a second transistor, whose base, emitter and collector are respectively connected to the other end of said second resistor, the one end of the primary winding of said transformer, and a junction of the other end of said first capacitor and the base of said first transistor;

a third transistor, whose collector is connected to a junction of the base of said second transistor and the other end of said second resistor, and emitter is connected to the cathode of said diode;

a third capacitor, connected between a base and the emitter of said third transistor;

a Zener diode, whose cathode and anode are respectively connected to the base of said third transistor and ground, for determining an output voltage of said DC/DC converter;

a fourth transistor forming said switch, whose base is connected to said controller and emitter is connected to the cathode of said diode;

a third resistor, whose one and the other end are respectively connected to the emitter of said fourth transistor and the cathode of said Zener diode, for determining a first Zener current for generating said first operation-supporting voltage; and a fourth resistor, whose one and the other end are respectively connected to the collector of said fourth transistor and the cathode of said Zener diode, for determining a second Zener current for generating said second operation-supporting voltage.

11. The power supply control as set forth in claim 10, wherein said receiver has only one said DC/DC converter.

12. A power supply control for a receiver comprising:

a battery;

a DC/DC converter, having a switch, for converting a voltage from said battery into a first operation-supporting voltage in a first state, for converting said voltage from said battery into a second operation-supporting voltage in a second state, 9 for supplying one of said first operation-supporting voltage and said second operation-supporting voltage to circuitry within said receiver; and a controller for controlling said switch based on said first and second state and for switching said first state to said second state at a predetermined timing;

wherein said DC/DC converter comprises:

a transformer, one end of a primary winding thereof being connected to said battery and one end of a secondary winding thereof being connected to ground potential;

a first resistor;

a first capacitor, connected at one end to the other end of the secondary winding of said transformer through said first resistor;

a first transistor, whose emitter, base and collector are connected to ground, the other end of said first capacitor and the other end of the primary winding of said transformer, respectively;

a diode, whose anode is connected to a junction of the collector said first switching transistor and the other end of the primary winding of said transformer;

a second capacitor, connected between ground and a cathode of said diode;

a second resistor one end of which is connected to ground;

a second transistor, whose base, emitter and collector are respectively connected to the other end of said second resistor, the one end of the primary winding of said transformer, and a junction of the other end of said first capacitor and the base of said first transistor;

a third transistor, whose collector is connected to a junction of the base of said second transistor and the other end of said second resistor, and emitter is connected to the cathode of said diode;

a third capacitor, connected between a base and the emitter of said third transistor;

a first Zener diode, whose cathode and anode are respectively connected to the base of said third transistor and ground, for determining an output voltage of said DC/DC converter;

a fourth transistor forming said switch, whose base is connected to said controller and emitter is connected to the cathode of said first Zener diode;

a third resistor, whose one and the other end are respectively connected to the emitter of said fourth transistor and the cathode of said diode, for determining a first Zener current for generating said first operation-supporting voltage.

13. The power supply control as set forth in claim 12, wherein said receiver has only one said DC/DC converter.

14. A power supply control for supplying at least two operating voltages converted from an output voltage of a battery for a receiver, comprising:

DC/DC converting means for:

converting said output voltage from said battery to a first operating voltage, which is higher than said output voltage, and supplying said first operating voltage to circuitry which is operated at said first operating voltage, including a first memory storing a receiver identification of said receiver, and converting said output voltage from said battery to a second operating voltage, which is higher than said first operating voltage, and supplying said second operating voltage to circuitry which is operated at said second operating voltage, including a second memory for storing data when provided with said second operating voltage but not when provided with said first operating voltage; and means for controlling said DC/DC converting means to convert said voltage from said battery into:

said first operating voltage when said receiver receives a transmission that does not indicate said receiver identification; and said second operating voltage, at a predetermined timing when said transmission does indicate said receiver identification;

wherein said second memory, supplied with said second operating voltage, stores at least a portion of data included in said transmission.

15. The power supply control as set forth in claim 14, wherein said DC/DC converting means comprises only one DC/DC converter.

16. A method for controlling a voltage supplied to a circuitry of a receiver which is selectively operated at a first operating voltage and at a second operating which is higher than said first operating voltage, said receiver including a RAM operable at said second operating voltage for writing and reading but not at said first operating voltage, said receiver including another memory operable at said first operating voltage and storing a receiver identification, the method comprising the steps of:

detecting a transmitted signal;

converting an output voltage from a battery into said first operating voltage which is higher than said output voltage;

supplying said first operating voltage to said another memory;

detecting whether said transmitted signal indicates said receiver identification;

when said transmitted signal indicates said receiver identification, converting said output voltage into said second operating voltage; and supplying said second operating voltage to said RAM at a predetermined timing to store at least a portion of data included in said transmitted signal.

17. A power supply control of a receiver, comprising:

a battery producing a battery voltage;

DC/DC converting means, responsive to control means, for converting said battery voltage into one of a first operating voltage and a second operating voltage, and for supplying one of said first operating voltage and said second operating voltage to circuitry within said receiver, including a first memory having a stored receiver identification, and including a second memory operable for storing data when supplied with said second operating voltage but not said first operating voltage; and control means for selectively controlling said DC/DC converting means to generate said one of said first operating voltage and said second operating voltage, and for supplying said circuitry with said second operating voltage when a received transmission indicates said stored receiver identification, wherein said second memory, while supplied with said second operating voltage, stores at least a portion of said received transmission.

18. The power supply control as set forth in claim 17, wherein said DC/DC converting means comprises only one DC/DC converter.

19. The power supply control as claimed in claim 17, wherein said control means determines whether said operation is to be executed based on an information content of a signal received by said receiver, and supplies said DC/DC converting means with a control signal so as to supply said second operating voltage to said circuitry.

20. The power supply control as claimed in claim 19, wherein said control means outputs said control signal when a predetermined identification number is detected from said signal received by said receiver.

21. A selectively called receiver, comprising:

a battery supplying a battery voltage;

a radio section for providing a waveform-shaped signal based on a radio frequency signal received by said receiver, said radio section being powered at said battery voltage;

a decoder for providing a decoded signal based on said waveform-shaped signal;

a first memory storing a receiver identification;

a second memory storing data when provided with a second voltage but not when provided with a first voltage lower than said second voltage;

a controller receiving said decoded signal, and generating a control signal when said decoded signal indicates said receiver identification; and a DC/DC converter providing to said controller, to said first and said second memory, and to said decoder:
 (1) said first voltage based on said battery voltage when said control signal is absent, and
 (2) said second voltage, after a time period of predefined duration, when said control signal is present;

said second memory storing at least a portion of said decoded signal when said control signal is present.

22. The selectively called receiver as set forth in claim 21, wherein:

said selectively called receiver comprises only one DC/DC converter;

said selectively called receiver further comprises a ROM that stores a respective identification code pertaining to said selectively called receiver; and said decoded signal indicates said operation whenever said respective identification code corresponds to a received identification code of said decoded signal.

23. A selectively called receiver that receives transmissions, comprising:

only one DC/DC converter, said only one DC/DC converter producing a selected voltage which is one of a first operating voltage and a second operating voltage higher than said first operating voltage;

a first memory storing a receiver identification; and a controller controlling said only one DC/DC converter to produce said selected voltage, and for detecting that a received one of said transmissions indicates said receiver identification;

a second memory for storing data when provided with said second operating voltage but not when provided with said first operating voltage;

wherein said controller selects said second operating voltage when said receiver identification is indicated by said received one of said transmissions, and otherwise selects said first operating voltage:

wherein said second memory stores at least a portion of data included in said received one of said transmissions when said receiver identification is indicated; and wherein, when said controller selects said second operating voltage, said only one DC/DC converter provides said second operating voltage to said second memory at least a predetermined amount of time before said second memory begins to store said portion of data.

* * * * *

UNITED STATES PATENT AND TRADEMARK OFFICE
CERTIFICATE OF CORRECTION

PATENT NO. : 5,821,738
DATED : October 13, 1998
INVENTOR(S) : Kinya TSUCHIYAMA, Takayasu ISHIDA and Nobuyuki KATADA It is certified that error appears in the above-identified patent and that said Letters Patent is hereby corrected as shown below:

Column 6, line 21, delete "9" and insert --and--.

Column 6, line 39, delete "9" and insert --and--.

Column 6, line 57, delete "9" and insert --and--.

Column 7, line 55, delete "9" and insert --and--.

Signed and Sealed this

Sixth Day of July, 1999

Attest:

Q. TODD DICKINSON

Attesting Officer

Acting Commissioner of Patents and Trademarks